(12) United States Patent
Bennett

(10) Patent No.: US 9,141,302 B2
(45) Date of Patent: Sep. 22, 2015

(54) SNAPSHOTS IN A FLASH MEMORY STORAGE SYSTEM

(71) Applicant: VIOLIN MEMORY INC., Mountain View, CA (US)

(72) Inventor: Jon C. R. Bennett, Sudbury, MA (US)

(73) Assignee: VIOLIN MEMORY, Santa Clara, CA (US)

( * ) Notice: Subject to any disclaimer, the term of this patent is extended or adjusted under 35 U.S.C. 154(b) by 66 days.

(21) Appl. No.: 13/865,666

(22) Filed: Apr. 18, 2013

(65) Prior Publication Data

US 2013/0282999 A1      Oct. 24, 2013

Related U.S. Application Data

(60) Provisional application No. 61/636,088, filed on Apr. 20, 2012.

(51) Int. Cl.
*G06F 12/16* (2006.01)
*G06F 3/06* (2006.01)
*G06F 11/14* (2006.01)
*G06F 11/20* (2006.01)

(52) U.S. Cl.
CPC .............. *G06F 3/065* (2013.01); *G06F 3/061* (2013.01); *G06F 3/0631* (2013.01); *G06F 3/0679* (2013.01); *G06F 11/1456* (2013.01); *G06F 11/2074* (2013.01)

(58) Field of Classification Search
CPC . G06F 11/1456; G06F 11/2074; G06F 3/065; G06F 3/0631
USPC .......................................... 711/162
See application file for complete search history.

(56) References Cited

U.S. PATENT DOCUMENTS

| 6,446,141 | B1 * | 9/2002 | Nolan et al. | 710/8 |
| 8,417,896 | B2 * | 4/2013 | Mizushima | 711/141 |
| 2007/0220490 | A1 * | 9/2007 | Kobayashi et al. | 717/124 |

* cited by examiner

*Primary Examiner* — Jae Yu
(74) *Attorney, Agent, or Firm* — Brinks Gilson & Lione

(57) ABSTRACT

A system and method of managing the storage of data in flash memory performs snapshots of the data by maintaining the data at the epoch that the snapshot is performed in the same physical memory location. Data that is modified after the snapshot is then stored to a new physical memory location and referenced to the snapshot location. When a user read operation is performed, the data is read from the original location if the read operation is for the snapshot data. The read operation for dynamic data is performed from the original location if the data has not change since the snapshot epoch, or from the referenced data location if the data has changed since the snapshot epoch. Snapshots are released by dereferencing the original location if the data has been changed since the snapshot epoch.

3 Claims, 4 Drawing Sheets

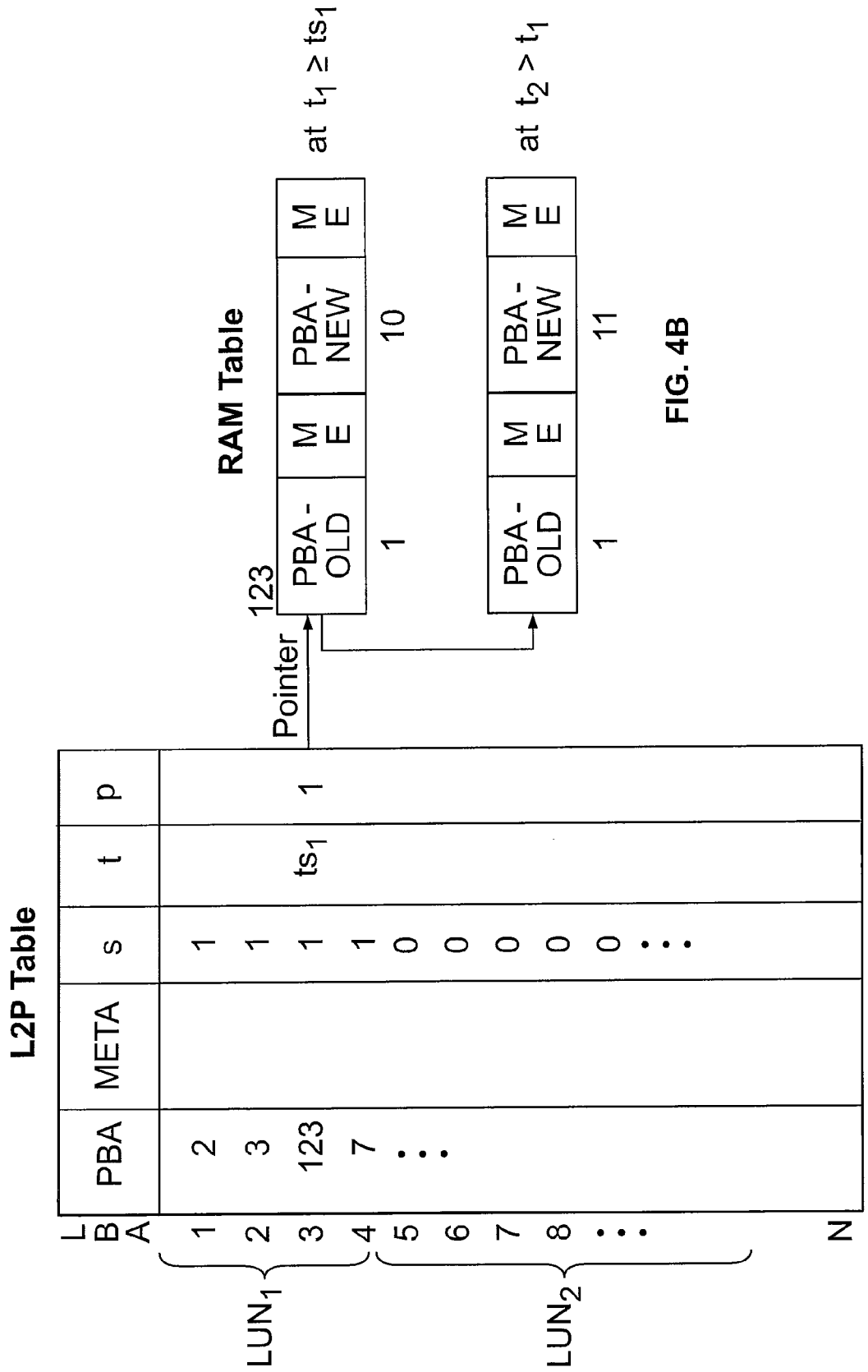

Page Status Bit Map

| PBA | | |
|---|---|---|
| 1 | 1 | = PBA_OLD@$t_1$ |
| 2 | 1 | = LBA$_1$ |
| 3 | 1 | = LBA$_2$ |
| ... | ... | |
| 7 | 1 | = LBA$_4$ |
| ... | ... | |
| 10 | 0 | = PBA_NEW@$t_1$ (INVALID) |
| 11 | 1 | = PBA_NEW@$t_2$ |
| 12 | F | = Free |
| ... | F | |
| M | F | |

BP →  (at PBA 12)

FIG. 4C

SNAPSHOTS IN A FLASH MEMORY STORAGE SYSTEM

This application claims the benefit of U.S. Provisional application Ser. No. 61/636,088, which was filed on Apr. 20, 2012, and is incorporated herein by reference.

BACKGROUND

NAND FLASH memory is electrically organized as a plurality of blocks of physical memory on a die (chip), and a plurality of dies may be incorporated into a package, which may be termed a FLASH memory circuit. The chip may have more than one plane, each plane configured so as to be separately addressable for erase, write and read operations. A block is comprised of a plurality of pages, and the pages may be comprised of a plurality of sectors. Some of this terminology is a legacy from hard disk drive (HDD) technology; however, as used in FLASH memory devices, some adaptation is made, as would be understood by a person of skill in the art.

NAND FLASH memory is characterized in that data may be written to a sector of memory, or to a contiguous group of sectors comprising a page. Pages can be written in sequential order within a block, but if page is omitted, the present technology does not permit writing to the omitted page until the entire block has been erased. This contrasts with disk memory where a change to data in a physical memory location may be made by writing to that location, regardless of the previous state of the location. A block is the smallest extent of FLASH memory that can be erased, and a block must be erased prior to being written (programmed) with data.

Earlier versions of NAND FLASH had the capability of writing sequentially to sectors of a page, and data may be written on a sector basis where the die architecture permits this to be done. More recently, memory circuit manufacturers have been evolving the device architecture so that one or more pages of data may be written in a write operation. This includes implementations where the die has two planes and the planes may be written to simultaneously. All of this is by way of saying that the specific constraints on reading or writing data may be device dependent, but the overall approach disclosed herein may be easily adapted by a person of skill in the art so as to accommodate specific device features. The terms "erase" and "write" in a FLASH memory have the characteristic that when an erase or a write operation is in progress, a plane of the FLASH memory chip on which the operation is being performed is not available for "read" operations to any location in a plane of the chip. Any other memory type with similar characteristics may be substituted.

One often describes stored user data by the terms sector, page, and block, but there is additional housekeeping data that is also stored and which must be accommodated in the overall memory system design. Auxiliary data such as metadata, error correcting codes and the like that are related in some way to stored data is often said to be stored in a "spare" area. However, in general, the pages of a block or the block of data may be somewhat arbitrarily divided into physical memory extents that may be used for data, or for auxiliary data. So there is some flexibility in the amount of memory that is used for data and for auxiliary data in a block of data, and this is managed by some form of operating system abstraction, usually in one or more controllers associated with a memory chip, or with a module that includes the memory chip. The auxiliary data is stored in a spare area which may be allocated on a sector, a page, or a block basis.

The management of reading of data, writing of data, and the background operations such as wear leveling and garbage collection, are performed by a controller, using an abstraction termed a flash translation layer (FTL) that maps logical addresses, as understood by the user, to the physical addresses of the memory where the data values are actually stored. The generic details of a FTL are known to a person of skill in the art and are not described in detail herein. The use of a FTL or equivalent is assumed, and this discussion takes the view that the abstraction of the FTL is equivalent of mapping an address of a page of user data to a physical memory location. The location may be a page of a block. This is not intended to be a limitation, but such an assumption simplifies the discussion herein.

A snapshot is used in, for example, data base systems (DBS) to freeze the values of an existing set of stored data at the time of the snapshot. The frozen data copy may be used, for example, for backup, study purposes, regression analysis, quality assurance, or the like. But, the operation of the data base or other program that created the frozen memory image continues, and changes to the user dynamic data need to be accommodated as transparently as possible to the user while the snapshot (frozen data) is being used for these other purposes. The time interval during which the snapshot is maintained is generally a user-determined parameter, but may also be defined in terms of the percentage of the frozen data image that has been obsoleted by changes to the dynamic data. The amount of memory needed to support the snapshot operation depends on the amount of the data that existed at the time of the snapshot that has been changed between the snapshot time and the time that the snapshot has been released. Releasing a snapshot, regardless of the specific terminology used, is the act or process of disassociating the data representing the snapshot from the dynamic data that has evolved since the time of the snapshot.

Since, in principle, all of the data present at the time that a snapshot has been initiated may be changed over a long enough period of time, the size of the memory used by a snapshot may ultimately equal that of the original data set. Generally, the time duration of a snapshot is sufficiently short that a smaller amount of memory may be used for each snapshot. A higher level system may monitor memory usage and manage the retention of snapshots based on a variety of criteria.

SUMMARY

A memory system is described having a memory module where the memory module has a memory controller, a buffer memory and a plurality of non-volatile memory circuits.

The memory controller may be configured to store data having logical addresses in the memory of the plurality of the non-volatile memory circuits. A snapshot operation may be performed at a first epoch such that, a change to the data having a same logical address occurring after the first epoch is stored in a memory circuit of the non-volatile memory circuit such that a read request for data at the same logical address for snapshot data is to one of (a) physical address where the data as of the first epoch is stored and a read request for dynamic data at the same logical address is to one of the physical address at which the data of the first epoch is stored if the data stored at the same logical address has not changed since the first epoch, or (b) to a physical address at which the data is stored if the data stored at the same logical address has changed since the first epoch.

A method of creating a snapshot of data includes providing a memory module, the memory module including a memory controller, a buffer memory and a plurality of non-volatile memory circuits.

In an aspect, the memory controller may be configured for performing operations of: storing data having logical addresses in the plurality of the non-volatile memory circuits at a first epoch, the logical address corresponding to a physical address in the non-volatile memory circuits. The controller may perform operations for determining that the data stored at the logical address has changed since the first epoch and storing the changed data at another physical address from that associated with the data stored at the logical address at the first epoch. The controller may be further operable for maintaining an association between the data of the first epoch and the changed data such that a read request for data at the logical address for snapshot data is to the physical address where the data as of the first epoch is stored and a read request for dynamic data at the logical address is to one of the physical address at which the data of the first epoch is stored if the data stored at the logical address has not changed since the first epoch, or to a physical address at which the data is stored if the data stored at the logical address has changed since the first epoch.

In another aspect, a computer program product is described the product being computer readable instructions, stored on a non-volatile memory for configuring a controller to perform the steps of:

storing data having a logical address in a memory circuit of a plurality of non-volatile memory circuits at a first epoch, the logical address corresponding to a physical address in the memory circuits;

determining that a change to the data stored at the logical address has change since the first epoch;

storing the changed data at another physical address from that associated with the data stored at the logical address at the first epoch;

maintaining an association between the physical locations of the data of the first epoch and the changed data such that a read request for data at the logical address for snapshot data is to the physical address where the data as of the first epoch is stored, and a read request for dynamic data at the logical address is to one of the physical address at which the data of the first epoch is stored if the data stored at the logical address has not changed since the first epoch, or to a physical address at which the data is stored if the data stored at the logical address has changed since the first epoch.

BRIEF DESCRIPTION OF THE DRAWINGS

FIG. 4A is an example of a data structure of a flash translation layer (FTL) storing information that may be used to maintain a snapshot of data at an epoch; B is a data structure linked to the data structure of FIG. 4A so as to permit requests for data from a logical block address to be satisfied with either snapshot data or dynamic data, depending on the form of the request; and, C is a bit map associated with the physical memory locations.

DESCRIPTION

Figure 1:
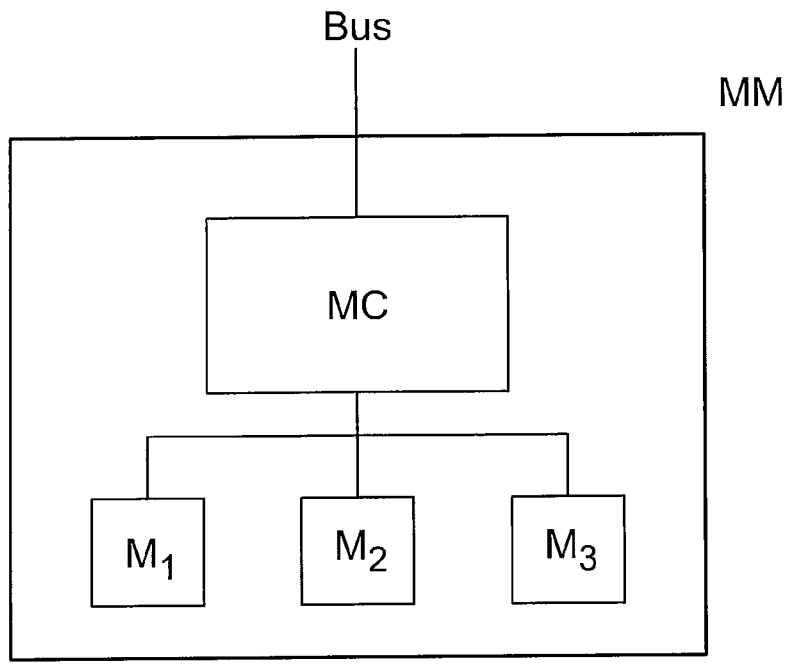
FIG. 1 is a simplified block diagram of a memory system having a memory controller and a plurality of memory modules and communicating with a user over an interface.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g., software, or in hardware, or in a combination of both. The machine-executable instructions can be used to cause a general-purpose computer, a special-purpose processor, such as a DSP or array processor, or the like, that acts on the instructions to perform functions described herein. Alternatively, the operations might be performed by specific hardware components that may have hardwired logic or firmware instructions for performing the operations described, or by any combination of programmed computer components and custom hardware components, which may include analog circuits. Such components may include an Application Specific Integrated Circuit (ASIC), Field Programmable Gate Array (FPGA), or the like.

The methods may be provided, at least in part, as a computer program product that may include a non-volatile machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the lime period during which the computer program product is stored on the volatile memory device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

FIG. 1 illustrates a memory module MM which may be connected to a bus in a memory system. Other memory system architectures may be used including ring buses, linear buses, bus trees and the like.

Data storage in the memory system may use RAID techniques so as to improve the data reliability, such as described in U.S. Ser. No. 12/079,364, "Memory Management System and Method" by the present inventor, filed on Mar. 26, 2008, which is incorporated herein by reference. For the present, we describe the operations as having been performed in a single memory module MM. However, these operations may be performed at any level of the memory system from the chip level to the overall memory system.

The memory module MM has a memory controller MC with an interface to the memory system bus and to a bus connecting to the FLASH memory circuits M associated with the memory module MM. Other features of the memory module MM that may relate to communication with other memory modules MM or the system memory controller are not shown, for simplicity.

Figure 2:
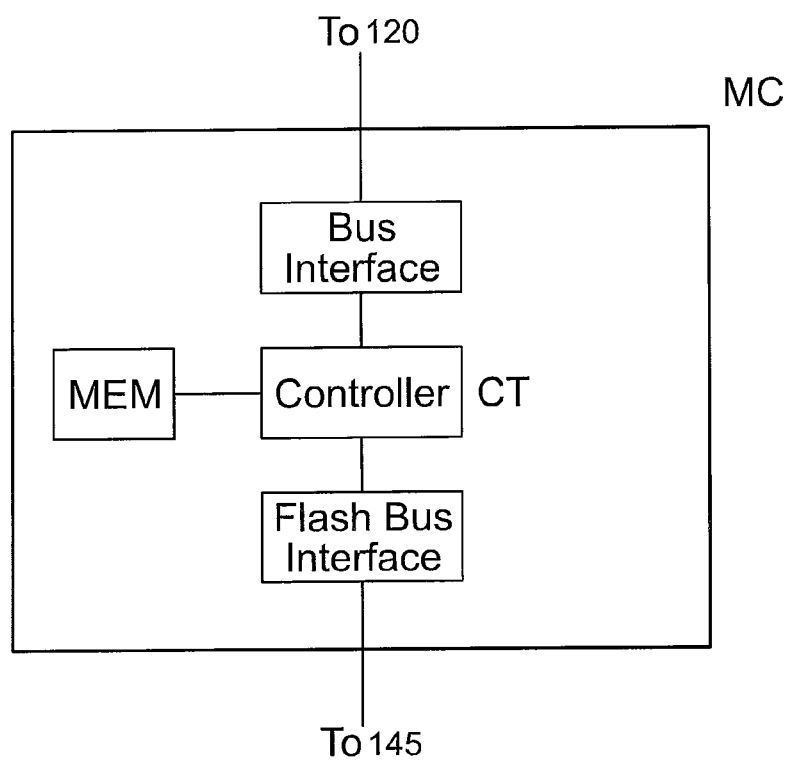
FIG. 2 is a simplified block diagram of the memory controller of FIG. 1 showing the bus interface, a controller for processing data and commands, a memory for storing programs, data and metadata, and interface to the memory circuits.

FIG. 2 shows details of the memory controller MC of the memory module MM. In addition to the interface to the system bus and to the FLASH memory bus, the MC may have a controller CT, which may be a microprocessor, application specific integrated circuit (ASIC), field programmable gate array (FPGA), or the like, and a working memory MEM. The working memory MEM may be volatile memory such as dynamic random access memory (RAM), non-volatile memory (NVM) such as NAND FLASH or a combination of memory types selected to meet specific design requirements. The working memory MEM may be used to store, amongst other data, the metadata for the data stored in the FLASH memory circuits, queues of operations to be performed, cached data, and the like. The metadata may include data needed to manage the housekeeping operations of the memory module MM. The memory MEM may also store the instructions for controlling the microprocessor, or the like.

Figure 3:
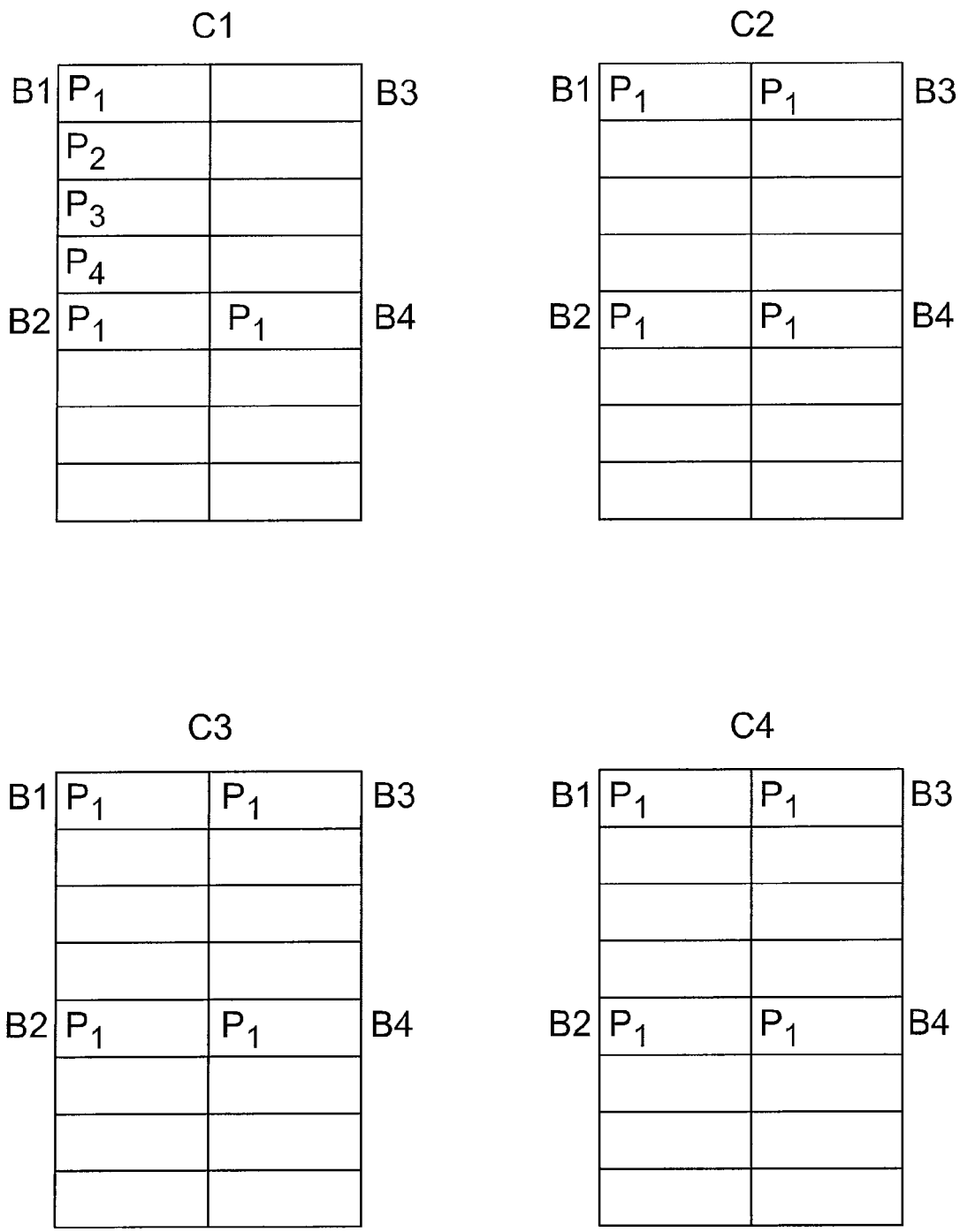
FIG. 3 is a conceptual layout of the storage of a memory circuit having a plurality of chips C, each chip having a plurality of blocks of pages of physical memory.

FIG. 3 is a simplified representation of a memory circuit M. Each memory circuit (typically a packaged product) comprises a plurality of semiconductor chips C, each chip C having a plurality of memory locations configured so as to form blocks B. Each block has a plurality of memory pages, each memory page being assigned a particular physical block address (PBA) to which data may be written, or from which previously written data may be read. A memory page P may have a size of, for example 2048 bits. Other sizes are used, and groups of memory pages may also be treated as a page (so called "superpage" or the like). While the pages of a block may be written to individually (subject, for example, to the rule that only a higher page number in the block B may be used for writing new data), erasure must be performed on a block basis. When a chip C is being written to (also called "programmed"), or erased, a read operation cannot be performed. Where a chip C has more than one circuit plane, the restriction on reading may be limited to the plane being erased or programmed.

A user requiring a snapshot of data stored in the MM issues such a request to the memory system. After being interpreted by, for example, the system memory controller, a command is sent to appropriate memory modules, including the specific address ranges to be included in the snapshot. The address range may be identified with a LUN (logical unit number) having been assigned to a plurality of LBAs. For simplicity, this discussion presumes that the snapshot is taken of the entire contents of a memory module MM.

The amount of physical memory in a memory module MM may be greater than that presented to the user. That is, the memory system or memory modules itself may have some memory for performing housekeeping operations, reducing write amplification, improving response time, providing spare memory in case of block or chip failures, or the like. This additional system memory is often described as "overprovisioning," and may be a significant fraction of the entire physical memory. Often, the portion of the physical memory used for overprovisioning may amount to between 10 and 50 percent of the total physical memory. Memory that comprises the overprovisioning memory may be reserved for system use, or may be managed by the Flash Translation Layer (FTL) or other housekeeping software. In the present discussion, but without intending this to be a limitation, the overprovisioned memory is presumed to be usable for any function of the memory system: that is, in the broadest sense, housekeeping (including garbage collection and wear leveling), user data and metadata. The specific physical memory locations of a memory module used for each function may be hidden from the user by a FTL abstraction, and may also be managed by other housekeeping algorithms.

A snapshot may be thought of as an accounting system where the data values stored at a particular logical block address (LBA) are preserved as at a particular point-in-time (epoch). That is, changes to the data values stored at a specific LBA that occur after the snapshot time do not affect the data value of the snapshot of the LBA, which was frozen at the time of the snapshot.

FIG. 4 shows one way of managing this process. The LBA address table for the user data maps each LBA to a physical address in the memory M. The physical address at which the data is stored is linked to the logical address of the data through an abstraction called the logical-to-physical address table (L2P) of the FTL. Let us assume that there is sufficient space in the memory module MM to store the user data, and the snapshot. At the time (epoch) of taking the snapshot, both the user dynamic data and the snapshot static data are the same data values. So, it is only necessary to account for the changes subsequent to this epoch. (Any physical movement of the storage location of the data due to housekeeping operations is presumed to be accounted for in the L2P table and the FTL and is not addressed in this discussion).

While specific data structures are used for descriptive purposes, a person of skill in the art will appreciate that there are a variety of approaches to the accounting process for data location and status which may be used to achieve an equivalent result. The data structures may be located in volatile or non-volatile memory depending on access time, persistence requirements and other characteristics of the design.

Where FLASH memory has been used, the physical memory associated with data that has been changed is "invalid". The data is changed in value by writing new data to the LBA, which results in writing the new data to an unused (free or previously erased) physical block address (PBA) as managed by the FTL. In accordance with the limitations of the FLASH memory circuitry, the invalid pages will need to be reclaimed by erasing prior to further use. Such invalid pages may not be immediately be reclaimed, as they may be located in a memory block that is not as yet sufficiently full to be selected by the housekeeping function for garbage collection.

The FTL abstraction contrasts with the method which would be used in a disk memory system. A disk memory may overwrite any memory sector (physical memory address) without an erasing process having been previously performed on that sector. Thus, the management of the physical location of the pages of snapshot data may be handled as a conventional file system operation, as once the pages of the snapshot are released by the file system, they are immediately available for writing of new data. Furthermore, the disk system may modify the data stored in a particular logical block address by overwriting the data stored in the physical disk sector or page associated with the logical block address.

Snapshot operations in a disk system may typically be characterized as "copy-on-write". That is, the data being modified by a write operation is first moved to another page location and the modified data being written may then immediately be written to the memory location from which the previous data has been relocated. Such an operation cannot be performed in a FLASH memory system without first erasing a block of memory comprising a plurality of pages so as to recover the block from which the data has been moved.

In the example herein, the snapshot data is considered to be "read only". That is, the data is frozen in time at the time of the snapshot, and there are no operations performed on the snapshot data except for read operations. In another aspect, there may be circumstances where the snapshot data is used in some dynamic analysis based on the data at the time of the snapshot. The accounting process for the data locations of the dynamic data and the snapshot data may be implemented by extensions to the snapshot processes described herein and will be apparent to a person of skill in the art.

The relationship between the logical block addresses and the physical page addresses in the FLASH memory may be managed through a L2P table as shown in FIG. 4A. In addition to the mapping of the logical block address (LBA) to the physical block address (PBA) additional data, metadata (ME), describing the stored data may also be provided. Additional data may be provided, for example, so as to indicate whether there is a snapshot in progress (S), the time at which a user write operation was performed (t), and whether a pointer to a data structure is needed to resolve the PBA of the indicated LBA, (P). So the column indicated PBA (P=0,1) represents either the PBA associated with the LBA (0) or a pointer P (1) to a base memory address where the locations of the user dynamic data and the snapshot data are stored.

Note that the term physical block address PBA is used to represent the location of a page of a physical block (minimum erasable group of pages). The PBA represents the physical location of the corresponding logical block of data (LBA), where the logical block of data may be, typically, a page of data.

The time, t, may be represented as a clock time, a common sequence number, or other monotonically increasing variable with appropriate temporal granularity.

The FLASH memory pages, as physical memory, may have one of three primary states: valid, invalid, or free (erased or never used). In an erased block B of FLASH memory, all of the pages are free pages. That is, they are available to be written to without a further erase operation or garbage collection being performed. Since the pages of a FLASH memory block are written in monotonically increasing order, a pointer BP may be used to designate the next free page, where the value of the pointer BP may the highest page number of a block of physical memory that has already been written. All pages in the block above the value of BP are free pages; that is, pages that have been erased or never been used, and which may be used to write data. Each time data is written, the pointer BP is incremented.

Pages having PBA values less than or equal to the BP are either invalid or valid, depending of the specific sequence of operations that has previously been performed by the memory system. As shown in FIG. 4C, a valid data state may be represented, for example, by a "1" and an invalid data state may be represented by a "0" in a bit map having an extent equal to the number of physical pages in the block of FLASH memory or in a plurality of blocks of the FLASH memory. The number of pages in the physical memory may be greater than the number of pages in the LBA table.

When the memory is operating without a snapshot having been performed, the value of S is "0" in the L2P table, and the P/PBA corresponds to a PBA in which the data of the LBA has been stored by the FLASH memory. This LBA data may be read in the ordinary way.

In accordance with the limitations of NAND FLASH memory, new (modified) data in a LBA is written to a next new (free) page of the physical memory, and the L2P table entry for the LBA is updated to reflect the new PBA where the data is stored. The LBA to PBA mapping may also be altered by system housekeeping programs such as garbage collection or wear leveling, typically as background operations. When this occurs, the PBA associated with the LBA is changed to point to the new physical location of the data as moved by the housekeeping program. So, the PBA points to the physical location of the data stored for the LBA. For simplicity, we will not show any data relocations due to housekeeping operations in this description.

The user (or program associated with a user, server or other entity) may initiate a snapshot operation, and this may be for all or less than all of the data stored in the FLASH memory system. The memory system may be used to store data of multiple users, or to store data for a variety of applications of a user, and each of the users of the memory may have different purposes, and service requirements. Whether a snapshot is requested, the type of RAID, the backup requirements, and the like, may differ. In an aspect, a group of LBA having a common set of descriptors of this type and allocated to a user may be termed a LUN (logical unit number). The LUN may map to a set of LBA values determined by a higher-level management utility. At another time, a different set of descriptors may be associated with a LUN, and the LUN may encompass a different range or grouping of ranges of LBAs.

In this example, a first snapshot is performed on LUN1 at ts1. The value of S in the L2P table is set to 1 for the LBA range of LUN1, the value of t may be set to ts1 and the value of P may be set to 0. Alternatively, the value of t may be left unchanged until such time as the data associated with the specific LBA has been altered.

The L2P table has a value for each LBA that is either the location in FLASH memory (PBA) of the data associated with the LBA, or is the value of a pointer P to memory location in, for example, dynamic memory when the data in the LBA has been altered by the user subsequent to the snapshot time ts1.

The values of PBA for LBA1, LBA2, and LBA4, in this example, are associated with PBA2, PBA3 and PBA7, respectively. However, the value of the data in LBA3 has been changed since the ts1, the time of the snapshot. The value of PBA3 is no longer that of the original data, but since the pointer flag P is 1, the PBA address in the L2P table is interpreted as a memory location in dynamic memory: in this case 123. This memory location holds metadata that enables tracking of the changes to the stored data since the time ts1 of the snapshot. In this example, the pointer address may be in random access memory (RAM).

Here, for LBA3, the pointer is to RAM memory location. A representative data structure is shown in FIG. 4B. The data structure contains the location in FLASH memory associated with the data at the time that the snapshot was taken (PBA_OLD) and the location in FLASH memory of the data that has changed (PBA_NEW), as well as ancillary data (ME). The data stored in PBA_NEW represents the storage location of a data value for the LBA where the data value has changed subsequent to the snapshot time.

Thus, the data in PBA_NEW memory location represents current data in the user environment and is up-to-date. As we have seen, this data will have been written to a previously-free physical memory location managed by the FTL. The data in PBA_OLD has not been changed, and thus represents that data that was stored in the LBA at the time of the snapshot at time ts1. The PBA_OLD address is the snapshot data, which is the state of the data at the time the snapshot was taken. If there had been no change to the data of a LBA since the time of the snapshot, then P=0, there is no pointer, and the value of PBA represents the values of both the snapshot data and the dynamic data, as they are the same data value.

Hence, a request to read data from (LUN1, LBA3) could return either the old data (at the time of the snapshot time ts1) or the data that had changed subsequent to that time, depending of additional parameters of the READ command. The data stored in PBA_NEW1, representing the dynamic data, at memory location 123 may be modified more than once during the validity period of the snapshot. For example, the data structure may have been instantiated at a time t1 that is later than ts1, when the data in LBA3 was initially modified. At a later time, t2, the dynamic data may have been further modified so that the PBA_NEW1 is no longer valid. This is shown at t2, where the metadata stored at the base address 123 has been modified so that PBA_NEW2 points to a PBA in FLASH where the latest changed data has been written. So, while the data at the time of the snapshot remains at PBA_OLD, the current data is at PBA_NEW2.

For a LBA where there has been no change in the data, such as LBA1, the L2P table has a pointer flag value P=0, and the value of PBA3 in the table remains the physical page location of the data in FLASH memory.

From the standpoint of the FLASH memory, the status of the pages in a block of memory may be represented by a bit map. As shown in FIG. 4C, each page (PBA) may be represented, for example, by a bit in an array having a size (in bits) equal to that of the number of pages in a block. The data in the array is valid for values of the PBA less than or equal to the BP, where BP is a pointer to the highest page number of the block that has been written (programmed) with data. A bit map is maintained for each block of pages of the memory. All pages having a page number value greater than BP are free pages. All pages below BP are either valid or invalid. Valid data may be data in the user LBA space that has changed since the snapshot time ts1 (PBA_NEW), or data that has not changed since the snapshot time ts1 (PBA or PBA_OLD). Invalid data (in a PBA) is data that has been changed by an operation on the L2P table, relocated by the FTL or the like. Invalid data, in the context of the physical memory, is data that is no longer associated with a LBA available to the user, either as dynamic data or as snapshot data. Note that the "old" data is not invalid and can be accessed by the user as part of the snapshot.

The user, that is, the entity that has requested a snapshot, will need to differentiate between making a request to read current (dynamic) data and making a request for the snapshot (frozen) data. In this instance, we conceptually represent a request for dynamic data by, for example, the tuple READ (LUN1, LBA1, 0), and when the request is processed, the value of flag P in the L2P table is checked. The pointer flag P=0, the value of PBA points to PBA2 in the FLASH memory. The data stored at PBA2 is valid as both dynamic and snapshot data as the value has not changed since the snapshot time ts1.

To specifically retrieve the snapshot data, the request tuple would be, for example, the tuple READ (LUN1, LBA1, 1), where the P=1 represents a snapshot sequence or identification number. In this example, only one snapshot is currently valid. The value of the flag P is checked and as P=0, the snapshot data is the same data as the dynamic data and is retrieved from the same address, PBA2.

However, a request to READ (LUN1, LBA3, K), is processed differently, depending on whether K=0 or 1. When READ (LUN1, LBA3, 0) is received, the associated value of the flag P for LBA3 is checked, and since P=1, the value of the PBA in the L2P table is interpreted as a pointer to the data structure of FIG. 4B, which may be located in RAM memory. That data structure is located at memory location 123 and indicates that the value of the PBA (PBA_OLD) for data at the time of the snapshot ts1 was PBA1, and the value of the PBA for data that has been changed subsequent to ts1 is PBA10 (PBA_NEW). That is, the changed data was written to another PBA, in this case PBA10. Both of these data values are valid, but for different epochs. So, when the request READ (LUN1, LBA3, 1) is received, the data is retrieved using the pointer P in the L2P table to the data structure in RAM so that the data in PBA1 is returned. However, when the request READ (LUN1, LBA3, 0), is received the data is retrieved from PBA10 and represents the user dynamic data.

Multiple changes to the user dynamic data in a LBA may occur during a snapshot validity period. For example, a command WRITE (LUN1, LBA3) would modify the dynamic data. The data at the time of the snapshot, stored in PBA_OLD does not change, but the data in PBA_NEW is to be modified to accommodate the write command. In accordance with the protocol for operating NAND FLASH memory, the modified data may be written to the next unused physical page in the memory block, in this case PBA11. So, the data in PBA10 is no longer valid as the current user dynamic data now has the value stored in PBA11. But, there has been no change in the value of the data (stored at PBA_OLD) for this LBA that existed at the time of the snapshot. So, the snapshot (frozen) data remains at PBA1. This may be accounted for by updating the metadata being pointed to in the RAM memory location 123 by L2P table as shown at t=t2 in FIG. 4B. So, when future requests READ (LUN1, LBA3, 0) are received, the data from PBA11 is returned. The data in PBA10 is now no longer valid. This is the state shown in FIG. 4C where the value in the bit map corresponding to PBA10 has been set to 0, where a 1 value indicated valid data. While the values in the bit map for PBA greater than 11 are shown as F (free), in a bit map they would typically all be set to a same binary value (all "0" or all "1" depending on the protocol).

As further time elapses, and the snapshot is retained, additional changes to the dynamic data may occur and, for each changed value, regardless of the LBA, a free page is written to and the previously used PBA is no longer valid. So, after a time, the free pages in the memory block become valid or invalid pages, and the block may be filled. When this occurs, or prior to the actually complete filling of the block, depending on the garbage collection protocol, the block will become available for garbage collection.

Each of the currently valid pages, whether the pages contain dynamic data or snapshot data, may be read from the physical memory location and relocated by writing the data into a free page in another memory block, so that the present memory block can be erased in order to reclaim the space used by the invalid data. PBAs marked as having invalid data are no longer referenced by the L2P table and need not be further processed.

For example, the data in PBA1 may be read, as it is marked as valid in the bit map. The metadata stored with the data in PBA1, for example, may include a pointer back to the L2P table, a time of writing, and other data-related information. In this example, the metadata in PBA1 would point back to LBA3, since the stored data represented the data in LBA3 at the time of the snapshot. However, we observe that the PBA associated with LBA3 in the L2P table is a pointer to the RAM data structure since the pointer flag P=1. In this instance, when the data in PBA1 is relocated, the value of PBA_OLD in the RAM memory location 123 will need to be modified to represent the PBA to which the data has been relocated by the FTL. The time at which the data in PBA1 was written is older than the time of the snapshot ts1 in the L2P table, and this physical memory page represents data that has not changed since the snapshot. The status of PBA1 may now be marked as invalid in the bit table.

Where the time at which the data was written to a PBA is later than ts1, such as would be the case for PBA11, the data is interpreted as dynamic data. The data in PBA11 may be relocated by the FTL and the status of PBA11 in the bit table updated to invalid. PBA_NEW in memory location 123 is updated to that of the PBA selected by the FTL. Since contents of each valid PBA is ultimately written to a memory location that is not in the current block, the bit in the flash bit map for the PBA being moved is set to 0, so that, after all of the valid data has been moved, all of the bits in the bit map for a block are 0. This indicates that the block may be erased.

Where snapshots are being retained for a period of time, both the RAM memory for the data structures and the FLASH memory for the updated dynamic data increases. That is, since an LBA may have both dynamic and snapshot data, as the number of LBAs that are modified during the snapshot validity increases, so does the RAM memory needed to retain the pointer values and the FLASH memory need to store the modified user data. When a snapshot is no longer needed, the FLASH memory used for the data may be released and the indirection for the modified data dereferenced.

At the conclusion of a snapshot, the pointers to RAM may be dereferenced. The RAM data at RAM 123 showed that the dynamic data of LBA3 was currently at PBA11. The snapshot data was at PBA1. However the latter data is no longer needed. So by dereferencing the pointer, the value for LBA3 in the L2P table would become 11, and P would be set to 0 so as to indicate that the PBA value pointed to a FLASH memory PBA location. In this circumstance, the flash bit map for PBA1 would be set to 0, indicating that the data stored therein is no longer being referenced. Proceeding through the pages of the data block, the LBA status of the snapshot L2P table is updated so that a READ (LUN1, LBA, 0) would return the dynamic data, and a READ (LUN1, LBA, 1) would not be a valid operation, as there is no snapshot data. This dereferencing of the pointers frees memory space in the RAM.

It is therefore intended that the foregoing detailed description be regarded as illustrative rather than limiting, and that it be understood that it is the following claims, including all equivalents, that are intended to define the scope of this invention.

What is claimed is:

1. A memory system comprising:
 a memory module, the memory module further comprising:
  a memory controller;
  a buffer memory;
  a plurality of non-volatile memory circuits;
  wherein the memory controller is configured to store data having a logical address in the plurality of the non-volatile memory circuits and for which a snapshot is performed at a first epoch such that a change to the data having a same logical address occurring after the first epoch, is stored in a memory circuit of the non-volatile memory circuit such that a read request for data at the same logical address for snapshot data is to the physical address where the data as of the first epoch is stored and a read request for dynamic data at the same logical address is to one of the physical address at which the data of the first epoch is stored if the data stored at the same logical address has not changed since the first epoch, or to a physical address at which the data is stored if the data stored at the same logical address has changed since the first epoch;
 wherein a change to dynamic data at a logical address that occurs subsequent to the first epoch creates a link to a data structure pointing to the physical location at which the changed dynamic data is stored, while maintaining an association of the physical address of the dynamic data at the first epoch for the same logical block address, and the link is created when the dynamic data is changed.

2. A method of creating a snapshot of data, the method comprising:
 providing a memory module, the memory module further comprising:
  a memory controller;
  a buffer memory;
  a plurality of non-volatile memory circuits;
 configuring the memory controller for:
  storing data having a logical address, in the plurality of the non-volatile memory circuits at a first epoch, the logical address corresponding to a physical address in the non-volatile memory circuits;
  determining that the data stored at the logical address has changed since the first epoch;
  storing the changed data at another physical address from that associated with the data stored at the logical address at the first epoch;
  maintaining an association between the data of the first epoch and the changed data such that a read request for data at the logical address for snapshot data is to the physical address where the data as of the first epoch is stored and a read request for dynamic data at the logical address is to one of the physical address at which the data of the first epoch is stored if the data stored at the logical address has not changed since the first epoch, or to a physical address at which the data is stored if the data stored at the logical address has changed since the first epoch,
 wherein a change to dynamic data at a logical address that occurs subsequent to the first epoch creates a link to a data structure pointing to the physical location at which the changed dynamic data is stored, while maintaining an association of the physical address of the dynamic data at the first epoch for the same logical block address, and the link is created when the dynamic data is changed.

3. A computer program product, stored on a non-volatile memory, comprising:

configuring a controller to perform the steps of:
  storing data having a logical address in a plurality of non-volatile memory circuits at a first epoch, the logical address corresponding to a physical address in the memory circuits;
  determining that a change to the data stored at the logical address has change since the first epoch;
  storing the changed data at another physical address from that associated with the data stored at the logical address at the first epoch;
  maintaining an association between the physical locations of the data of the first epoch and the changed data such that a read request for data at the logical address for snapshot data is to the physical address where the data as of the first epoch is stored, and a read request for dynamic data at the logical address is to one of the physical address at which the data of the first epoch is stored if the data stored at the logical address has not changed since the first epoch, or to a physical address at which the data is stored if the data stored at the logical address has changed since the first epoch,
  wherein a change to dynamic data at a logical address that occurs subsequent to the first epoch creates a link to a data structure pointing to the physical location at which the changed dynamic data is stored, while maintaining an association of the physical address of the dynamic data at the first epoch for the same logical block address and the link is created when the dynamic data is changed.

* * * * *